(No Model.) 2 Sheets—Sheet 1.

G. H. FOX.
METHOD OF MAKING METAL TUBES.

No. 285,025. Patented Sept. 18, 1883.

Witnesses.
H. E. Lodge
Ma. D. Porter

Inventor.
George H. Fox.
F. Curtis, Atty.

(No Model.) 2 Sheets—Sheet 2.

G. H. FOX.
METHOD OF MAKING METAL TUBES.

No. 285,025. Patented Sept. 18, 1883.

Witnesses.
H. E. Lodge
Thos. J. Bailey

Inventor.
George H. Fox.
F. Curtis. Atty.

UNITED STATES PATENT OFFICE.

GEORGE HENRY FOX, OF BOSTON, MASSACHUSETTS.

METHOD OF MAKING METAL TUBES.

SPECIFICATION forming part of Letters Patent No. 285,025, dated September 18, 1883.

Application filed March 21, 1883. (No model.)

*To all whom it may concern:*

Be it known that I, GEORGE HENRY FOX, a citizen of the United States, residing at Boston, in the county of Suffolk and State of Massachusetts, have invented certain new and useful Improvements in the Method of Making Metal Tubes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In my first experiment in forming a welded tube by continuously welding a strip about a mandrel the edges of the strip were simply chamfered in order to lap over or upon each other, the strip heated and coiled about the mandrel, and pressure applied to the seam by a hammer or rolls, the edges of the "weld" upon the inside of the tube as a matter of necessity coming directly in contact with the periphery of the mandrel. I found that the low temperature of the mandrel was transmitted to the strip so quickly as to chill the metal and prevent welding of the joint on its inner edge. I then formed a bevel upon the inner corner of the chamfered edge of the strip, which removed the actual point of juncture of the lap from contact with the periphery of the mandrel, and my success was completed as the blow or pressure upon the exterior of the lap effected the welding of the joint before the low temperature of the mandrel could be imparted to the strip sufficiently to interfere with the welding, and at the same time forcing it clear down upon the mandrel.

Figure 1:
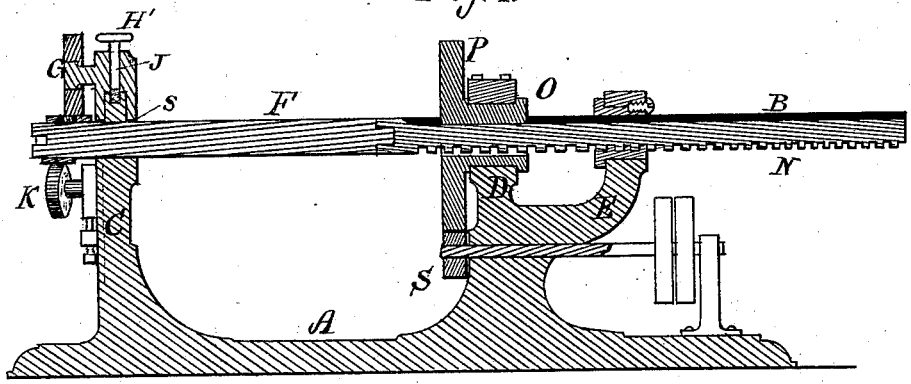
Figure 2:
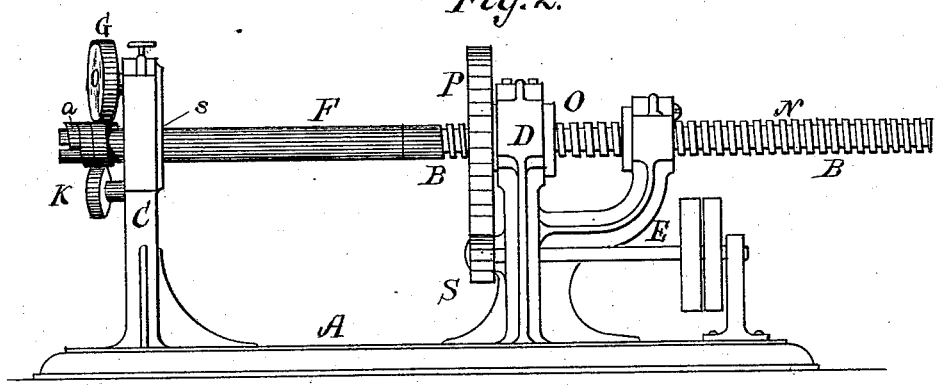
Figure 3:
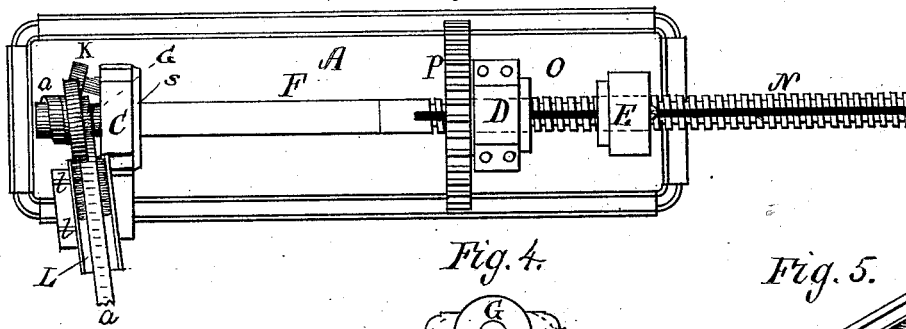
Figure 4:
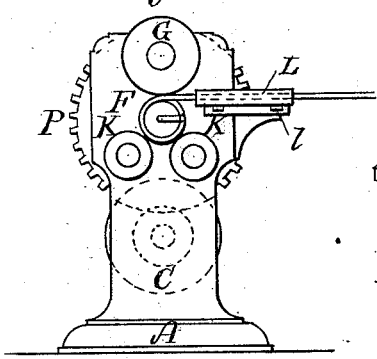
Figure 5:
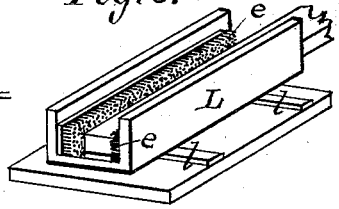
Figure 6:
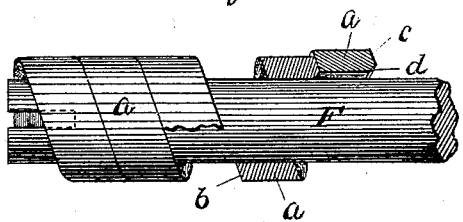
Figure 7:
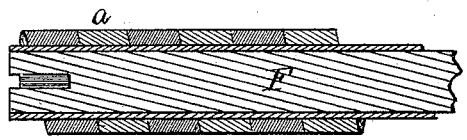
Figure 8:
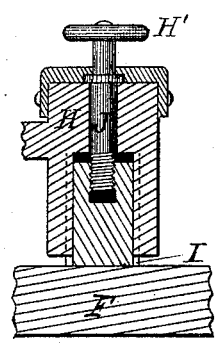
Figure 9:
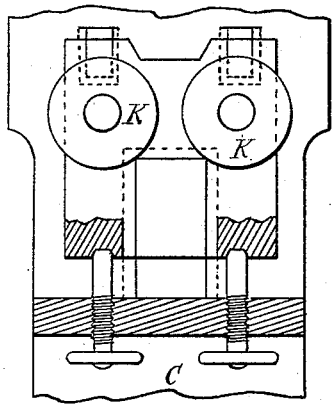

The drawings accompanying this specification represent, in Figure 1, a view of a machine for carrying out my invention, such view representing the mandrel and part of a tube built up upon it, while Fig. 2 is a side elevation, Fig. 3 a plan, and Fig. 4 an end view, of the same machine. Fig. 5 is a perspective view of the movable guide or trough. Fig. 6 is a sectional elevation of the mandrel and strip of metal in process of construction; Fig. 7, a longitudinal section of a mandrel with non-conducting material thereon; Figs. 8 and 9, detailed views of the manner of adjusting the welding-rollers.

In these drawings the machine is shown as composed, in the present instance, of a head-stock, A, carrying a rotary arbor, B, after the manner of turning-lathes, with the exception that in addition to the ordinary standards or uprights, C D, of the ordinary head-stock, I preferably add a third standard, E, to support a nut to receive a peripherally-screw-threaded shaft to feed the mandrel, as hereinafter explained. The mandrel upon which the metal strip is coiled in the building up of a tube is shown at F as supported at its front end in bearings $s$ in the standard C, while at its rear end the mandrel is stepped in the front end of the arbor B in such manner as to be readily removable from the latter, and yet compelled to revolve with the latter when stepped to it. The object of connecting the mandrel removably to the arbor in this manner is to permit an interchange of mandrels of different sizes, according to the diameter of the tube to be formed, and also to allow the substitution of an empty mandrel for one filled, or upon which a tube has just been wound. Moreover, I pivot to the front face of the standard C, above the mandrel F, a disk or roller, G, which serves to exert pressure upon the strip of metal as it is coiled in a welding state about the mandrel. As the space between the periphery of this roller and that of the mandrel should be less than the thickness of the strip to be welded in order to effect the welding of the metal, and as strips of varying thickness will be employed in the manufacture of tubes of different varieties, it is essential that the roller G be capable of being adjusted in height relatively to the mandrel. A manner of doing this would suggest itself to any good mechanic with the exercise of ordinary skill. As shown in the accompanying drawings, the pivot of the roller is carried by a block, H, sliding in ways I in the upper part of the standard C, this block being adjusted in position by a screw, J, screwing into the top of the standard and swiveled at its upper part to the block H, as shown at H', a suitable handle or hand-wheel being added to the upper end of the screw.

In addition to the roller G, I prefer to employ additional twin rollers, K K, pivoted to the standard C below, and bearing against the strip of metal in the same vertical plane as the roller G, the object of the rolls being to provide a firm support to the tube or mandrel and relieve the bearings in the standard C of the strains and thrusts to which it would otherwise be subjected, as well as to smooth the surface of the tube and more effectually complete the welding. The rollers G K K, especially the roller G, should stand at an obtuse angle to the axis of the mandrel, as shown in the drawings, in order to travel over the seam of the tube in a direction parallel, or practically so, to the spiral path followed by such strip relatively to the axis of the mandrel.

It is essential or very desirable that the metal strip be presented to the mandrel in a path parallel to the coils of the tube being built up upon such mandrel, in order to prevent the overriding of the strip on the one hand or separation of the coils on the other, on the principle of thread-spooling machines, with this difference, that while in thread-spooling machines the thread-guide traverses the spool, in my case the mandrel traverses the guide. To effect this I have shown at L in the drawings a trough or guide, the effective width and depth of which corresponds to that of the metal strip, this trough being secured adjustably to the front part of the standard C, and moving upon guides *l l*, the latter being parallel to the axis of the mandrel, in order that the axial alignment of the trough shall always be in unison or parallel with the angle of obliquity between the mandrel and the strip of metal being wound. Its delivery end or mouth is so situated as to terminate immediately in front of the roller G, where it is nearest to the mandrel, the angle of the trough in each instance corresponding practically, if not literally, with the pitch of the feed-screw. My object in securing the trough adjustably to its support is that its position may be varied to adapt it to changes in the pitch of the feed-screw, and then by means of the parallel guide-bars continue so to move parallel with such pitch; hence the strip will always be run at the same angle for any given width.

In welding two surfaces it is an essential feature that the surface of juncture should be entirely free from "scale," and to effect and accomplish this I have provided the edges or sides of the trough with wire brushes or cards *e e*, which, as the strip is fed along, wipe off the scale upon the edges, as it is only this portion which is to be brought together and welded, hence producing an entirely clean surface just prior to the entering of the strip upon that portion of the mandrel under the roll.

In lieu of the stationary brush or card before named for removing scales from the strip prior to the action of the rolls upon it, as before explained, a rotary, vibratory, or reciprocating brush may be employed.

To rotate and to feed—that is, advance and retract—the arbor B and through the latter the mandrel F, I cut upon the arbor B a peripheral screw-thread, N, which I screw through the upper part of the standard E, or a bushing or nut inserted in such standard, while at its front part this screw passes loosely through the hub O of a spur-gear, P, such hub being supported in a bearing, Q, in the upper part of the standard D before named, and connected with the screw N by an ordinary spline-and-groove connection, R, in order that the gear may put the screw in rotation, and the screw be permitted to play longitudinally through such gear.

To put the gear P in rotation I employ a pinion, S, which is pivoted to the standard D, below the said gear, by a shaft, T, and meshes with said gear, the shaft T of the pinion being provided with a driving-pulley, U.

The front end of the arbor B is connected removably with the rear end of the mandrel, in order to be readily disconnected from the latter, my object in this being twofold, one being to replace a fresh mandrel for one that has been filled, either of the same or different diameter, and, secondly, to enable the arbor to be readily replaced by another when a strip of one width is substituted by one of another width, since any change in the width of the strip necessarily changes the pitch of the spiral path described by the coils of the tube forming upon the mandrel, it being understood that the pitch of the threads of the screw correspond, as before stated, to the pitch of the welding-joint.

To produce a tube of any desired length, I provide a strip of metal, *a*, of the requisite thickness and width, and I chamfer the edges of the strip in parallel planes, as shown at *b c* in Fig. 6, and I then bevel the inner corner of one edge of the strip at an opposite angle, as shown at *d* in Fig. 6. The front end of the heated strip is now secured to one end of the mandrel, and the latter put in rapid rotation in a spiral path, the rollers or hammers operating upon the lap of the chamfered edges of the strip to weld such lap, and the feeding of the strip and coiling of the same about the mandrel being continued until the strip is exhausted, or a tube of the desired length obtained. The longitudinal feed motion of the mandrel keeps time with the continuous feed of the strips, in order that the lap of such strip shall always be between the rolls. The bevel *d*, as before stated, removes the inner termination of the lap from direct contact with the mandrel, for reasons stated, until pressure is exerted.

In lieu of the bevel *d*, the inner side or face of the strip *a* may be grooved to lessen the area in contact with the mandrel, or the periphery of the mandrel may be thus grooved for a like purpose. This, however, would be attended with certain disadvantages of expense and otherwise, and I prefer the bevel upon the strip.

In addition to the preliminary pressure upon the seam of the accumulating tube by the rollers or hammers for the purpose of welding, the tube may be subjected to one or more subsequent pressures, should it be found desirable so to do, in order to finish the surface. The first subsequent pressure is upon the exterior of the tube, in order to stretch the metal sufficiently to enable it to be readily removed from the mandrel. But for this pressure the tube in cooling would shrink upon the mandrel to such an extent that its removal would be difficult.

In lieu of the rolls, a hammer or hammers imparting rapid repetitive blows may be employed to compress the metal of the tube.

Among the purposes to which my invention is especially applicable is the manufacture of gun-barrels. Heretofore these barrels have been produced by coiling a strip about a mandrel with the edges simply abutting and repeatedly heating and hammering the accumulating coils, as hereinbefore premised.

Another purpose to which my invention is especially applicable is the manufacture of wrought-metal couplings for steam, water, and other pipes. A tube of any desired length may be made by my system very rapidly and perfectly, to be cut up into the desired lengths for use.

In my process of making tubes it is evident that the position of the fiber of the material composing the same lies transversely to the axis of the tube, and by this construction much greater strength is afforded with a given thickness of tube than in any of the other processes before mentioned in which the fiber lies parallel with the axis of the tube.

I do not restrict myself to the manner herein shown for isolating the inner edge of the strip from direct contact with the mandrel, as shown in the bevel $d$, or the grooving of the strip or mandrel, as I consider this feature of my invention to consist in the method of isolating the inner edge, rather than in the exact means for effecting the result.

I also consider my invention to consist in a tube composed of a spirally-wound strip of metal with its edges overlapping and welded.

In the operation of the above-described machine the strip is first properly heated to the welding-point and one end of it secured to the front or outer end of the mandrel, the latter having been previously retracted to its extreme position, as shown in the drawings. The machine is now put in motion, the mandrel being both rotated and fed forward by the conjoint action of the gear P and feed-screw N, the result being that the metal strip is coiled about the mandrel until the desired length of tube has been obtained, when the machine is stopped and the tube and mandrel removed. As the edges of the strip overlap, the welding of the joint is effected by the pressure of the rolls G K K, as before premised.

A useful application of the principle of my invention would be to incase non-corrosive metal tubes in an envelope of wrought-iron or steel. For various uses in the arts it is desirable to have a non-corrosive lining to a tube which shall possess strength and lightness. A tube may be first placed upon the mandrel and the iron or steel strip coiled and welded about it, as before explained, or the tube itself may constitute the mandrel. For many uses it may be desirable to form a tube oval or polygonal in cross-section. In this case a mandrel of the form corresponding to the desired shape of tube will be employed.

For re-enforcing cast-metal ordnance or guns with a welded steel or iron band my method will be practicable and effective. The steel core, after being rifled and turned off on the outside, is used as a mandrel, and the wrought-iron or steel strip wound and welded about it. Then another strip is welded on, and this process may be continued until the desired thickness is attained, by which an immensely-strong tube is built up at a comparatively small expense, compared with casting a gun of the same size.

In lieu of coiling the metal strip directly about the mandrel and isolating the joint, as hereinbefore described, the mandrel may be first covered with a substance which is a slow conductor of heat, by which means the welding of the strip can be effected before the low temperature of the mandrel can be communicated to the tube. (See Fig. 7.)

Another valuable application of the principle of my invention is seen in the manufacture of pulley-rims. In this case a hub cast with arms having sectional fellies will be employed, the hub being bored and placed upon the mandrel. Circular heads are then slipped upon the mandrel, constituting together a temporary band, and the heated strip coiled and welded about the periphery of these hubs. The hubs are now removed, and the pulley-rim is complete.

In the manufacture of cannon under my principle the relative movement of the arbor and strip will probably be reversed—that is, the gun would have no longitudinal movement and the strip would be presented by a carriage traveling along the gun.

The machine and article hereinbefore described may form subjects of separate applications.

I claim—

The process of manufacturing metal tubes, consisting in the following steps: first, chamfering the edges of a metallic strip in parallel planes and beveling one of said edges at an opposite angle, then heating this strip and winding it on a mandrel with the edges of the strip overlapping, and, finally, welding the said edges together by pressure applied to the periphery of the tube, substantially as set forth.

In testimony whereof I affix my signature in presence of two witnesses.

GEORGE HENRY FOX.

Witnesses:
H. E. LODGE,
F. CURTIS.